(No Model.)
N. P. BOLIN.
CLEVIS FOR PLOWS.
No. 539,788. Patented May 28, 1895.
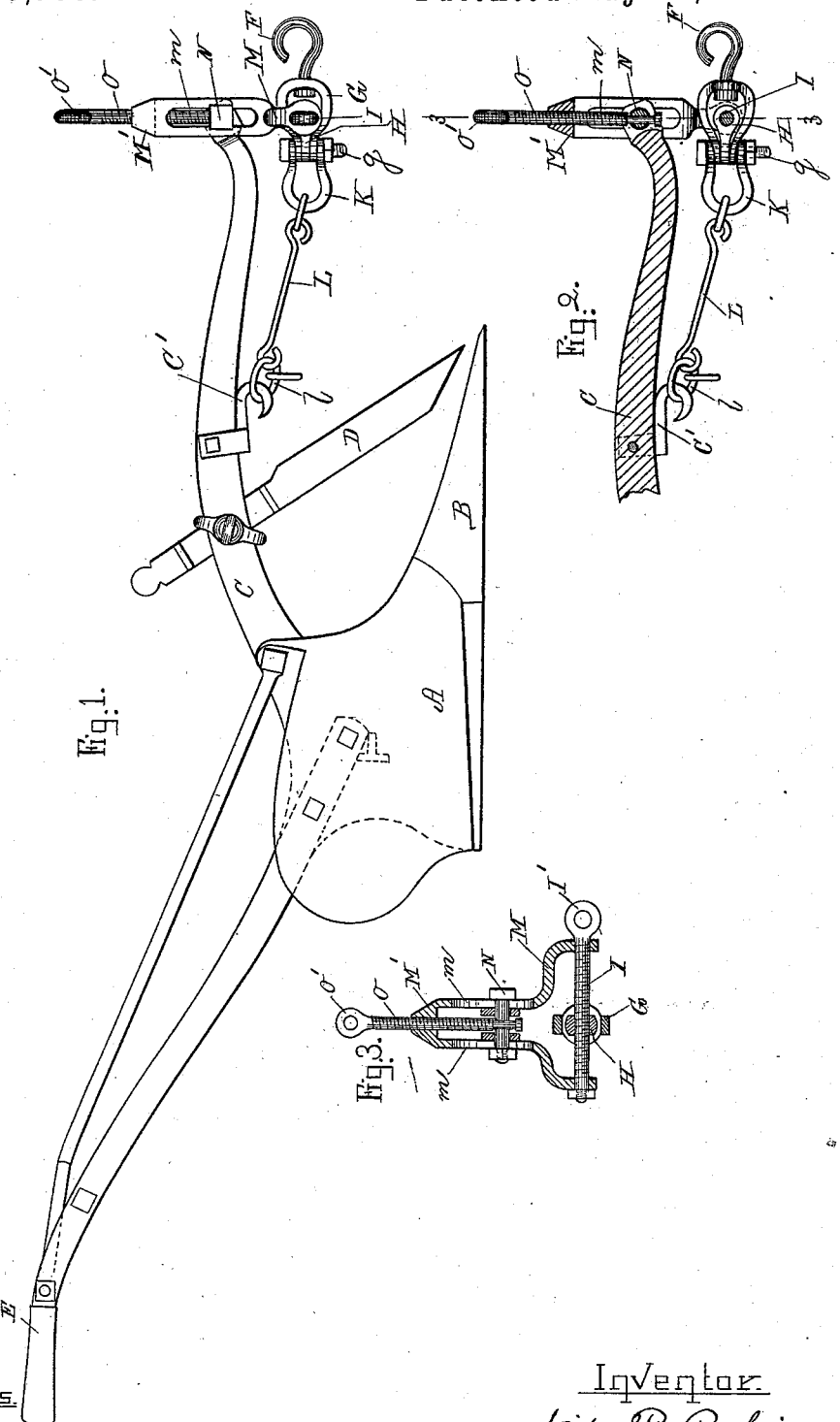
Witnesses
Lauritz N. Möller
Charles A. Harris
Inventor
Nils P. Bolin
by Alban Andréen
his atty.

UNITED STATES PATENT OFFICE.

NILS P. BOLIN, OF BROCKTON, MASSACHUSETTS.

CLEVIS FOR PLOWS.

SPECIFICATION forming part of Letters Patent No. 539,788, dated May 28, 1895.

Application filed December 10, 1894. Serial No. 531,374. (No model.)

*To all whom it may concern:*

Be it known that I, NILS P. BOLIN, a citizen of Sweden, and a resident of Brockton, in the county of Plymouth and State of Massachusetts, have invented new and useful Improvements in Clevises for Plows, of which the following, taken in connection with the accompanying drawings, is a specification.

This invention relates to improvements in clevises for plows and it consists in an adjustable device connected to the forward end of the plow beam, to which the draft hook is attached, so as to enable such draft hook to be adjusted up or down or in a lateral direction for purposes hereinafter to be described, reference being had to the accompanying drawings, wherein—

Figure 1 represents a side elevation of a plow provided with my adjustable device. Fig. 2 represents a longitudinal section of the forward portion of the plow-beam and its adjusting device, and Fig. 3 represents a cross-section on the line 3 3 shown in Fig. 2.

Similar letters refer to similar parts wherever they occur on the different parts of the drawings.

In Fig. 1 A, represents the plow share of a plow as usual to which is secured the point B. C is the beam with its adjustable colter D as is usual in devices of this kind.

E are the handles by means of which the plow is guided as usual.

F is the draft hook to which the animals are hitched in any suitable manner. Said draft hook is pivotally connected to a bail G, the rear end of which is pivoted, by means of a bolt *g*, to a nut H, within which works a lateral screw bolt I as shown. On the bolt *g* is also pivoted a bail K which is adjustably connected to a hook C' on the beam C by means of a link L and rings or chain portion *l* secured to the rear end of said link as shown in Figs. 1 and 2.

The ends of the lateral screw I is journaled in bearings in the lower ends of a yoke M as shown in Fig. 3. The upper forked sides of said yoke are provided with vertical slots *m*, *m* through which is loosely guided a lateral bolt or pin N which passes through a perforation in the forward forked end of the beam C. To said bolt or pin N is pivotally connected the lower end of an adjusting screw O, the upper end of which is screwed through the upper screw threaded head M' of the yoke M as shown in the drawings.

O' and I' are perforated eyes respectively in the ends of the adjusting screws O and I by means of which said screws may be adjusted by the aid of a pin, stick, nail or any similar pointed tool. Said screws may be provided with square or polygonal heads if so desired, and adjusted by means of a suitable key or wrench without departing from the essence of my invention.

The operation of the invention is as follows: If it is desired to plow deep I raise the hook F by turning the screw O to the right, and if it is desired to lower the said hook F to plow less deep, I do so by turning the screw more or less to the left. If it is desired to cut a wide sod I move the hook F toward the right side of the plow by turning the screw I to the right more or less and if it is desired to cut a narrow sod I move said hook more or less toward the left by turning the said screw I to the left. By adjusting the link L and its rings or chains *l* to the hook C', the draft hook F is made adjustable to and from the draft animals according to their size as may be desired.

Having thus fully described the nature, construction, and operation of my invention, I wish to secure by Letters Patent and claim—

1. In a clevis for plows a vertically adjustable yoke M having slots *m*, *m* adapted to receive a pin N pivoted to the forward end of the beam C combined with an adjusting screw pivotally connected to said pin and screwed through the upper portion of the yoke, substantially as and for the purpose set forth.

2. In a clevis for plows a yoke M pivotally connected to the end of the plow beam and vertically adjustable thereon combined with a lateral screw I journaled in said yoke and having a nut H working thereon a bail G pivoted to said nut and a swivel draft hook F connected to said bail, substantially as and for the purpose set forth.

In testimony whereof I have signed my name to this specification, in the presence of two subscribing witnesses, on this 8th day of November, A. D. 1894.

NILS P. BOLIN.

Witnesses:
ALBAN ANDRÉN,
SAMUEL J. CRADDOCK.